United States Patent [19]

Rossi

[11] 4,240,916

[45] Dec. 23, 1980

[54] POUR POINT DEPRESSANT ADDITIVE FOR FUELS AND LUBRICANTS

[75] Inventor: Albert Rossi, Warren, N.J.

[73] Assignee: Exxon Research & Engineering Co., Florham Park, N.J.

[21] Appl. No.: 704,022

[22] Filed: Jul. 9, 1976

Related U.S. Application Data

[63] Continuation-in-part of Ser. No. 515,563, Oct. 17, 1974, abandoned.

[51] Int. Cl.$^3$ ............................................. C10M 1/26
[52] U.S. Cl. ............................... 252/56 D; 252/56 R
[58] Field of Search ........................... 252/56 R, 56 D

[56] References Cited

U.S. PATENT DOCUMENTS

| | | | |
|---|---|---|---|
| 2,542,542 | 2/1951 | Lippincott et al. | 252/56 D |
| 2,543,964 | 3/1951 | Giammaria | 252/56 R |
| 2,615,845 | 10/1952 | Lippincott et al. | 252/56 D |
| 2,977,334 | 3/1961 | Zopf et al. | 252/56 R |
| 3,231,498 | 1/1966 | de Vries | 252/56 D |
| 3,381,022 | 4/1968 | Le Suer | 252/56 D X |
| 3,522,179 | 7/1970 | Le Suer | 252/56 D X |
| 3,531,440 | 9/1970 | Mehmedbasich et al. | 252/56 R X |
| 3,694,176 | 9/1972 | Miller | 252/56 R X |

*Primary Examiner*—Andrew Metz
*Attorney, Agent, or Firm*—Roland A. Dexter

[57] ABSTRACT

An oil-soluble copolymer, useful as a pour point depressant for lubricating oils, is composed of about equimolar amounts of 1-olefins and maleic anhydride, said 1-olefins being a mixture comprising from about 25 to 75, preferably 30 to 55, mole percent of straight chain $C_{20}$-$C_{24}$ 1-olefins and from about 25 to 75, preferably 45 to 70, mole percent of $C_{10}$-$C_{14}$ 1-olefins.

These useful copolymers are oil-soluble, essentially free of olefinic unsaturation and have a number average molecular weight of from 1,000 to 30,000. Pour point depressant activity of said copolymers is enhanced by esterification with a $C_1$ to $C_8$ alcohol, e.g. 2-ethyl hexanol.

The copolymers are usefully admixed with lubricants in an amount of from 0.01 to 3 wt. % based on the total weight of the admixture.

3 Claims, No Drawings

POUR POINT DEPRESSANT ADDITIVE FOR FUELS AND LUBRICANTS

RELATED CASES

This application is a continuation-in-part of copending U.S. Patent Application Ser. No. 515,563, filed Oct. 17, 1974, now abandoned.

BACKGROUND OF THE INVENTION

1. Field of the Invention

This invention relates to a lubricating oil additive and lubricating oils incorporating a minor proportion of said additive to depress the pour point of said oil.

The additive is the copolymer of 1-olefins, said 1-olefin being a mixture comprising from about 25 to 75 mole percent of a straight chain $C_{20-24}$ higher olefin and from about 25 to 75 mole percent of a $C_{10-14}$ lower olefin, and maleic anhydride, said 1-olefins and said anhydride being present in about equimolar amounts. The additive can be usefully esterified with alcohols having one to eight carbons, e.g., 2-ethyl hexanol.

2. Prior Art

A wide variety of compositions comprising polymeric materials derived from the addition reaction of alpha-olefins and dicarboxylic alkenes have been described in the literature as dispersants for fuels and lubricants, and as viscosity index improvers for lubricants.

U.S. Pat. No. 2,615,845 teaches that the copolymer of maleic anhydride and a straight chain alpha-olefin having up to 24 carbon atoms (see claim 2), which is subsequently esterified with long, straight chain, saturated alcohols in order to make it suitably oil-soluble, can be usefully added to a mineral lubricating oil for pour point depression.

U.S. Pat. No. 2,542,542 discloses the general preparation of copolymers of ethylene-1,2 dicarboxylic acids, and their derivatives and long chain olefins containing from 8 to 24 carbon atoms and shows only copolymers derived from 1-octadecene to be useful as lubricating oil pour point depressants.

U.S. Pat. No. 2,655,479 points out that a factor of particularly great effect on the pour depressant activity of acrylic ester polymers is the length of the alkyl side chains (apparently a function of the oil solubilizing effect of the alkyl side chain). This factor, however, is further limited by the consideration that the "polymers of single esters are rarely pour point depressants".

U.S. Pat. No. 2,977,334 teaches a copolymer of ethylene with maleic anhydride, wherein the maleic anhydride units are subsequently partially esterified or aminated. The patentee teaches various alcohols, including 2-ethylhexyl (column 4, line 32) for this purpose.

SUMMARY OF THE INVENTION

It is the purpose of this disclosure to teach the utility of polymeric additives derived from the equimolar reaction of maleic anhydride and a mixture of straight chain $C_{20-24}$ 1-olefins and $C_{10-14}$ 1-olefins to depress the pour point of mineral oil lubricants.

Oil-soluble copolymers, particularly useful as pour point depressants when compounded in lubricating oils in a pour point depressing amount, e.g., 0.01 to 3.0 wt. %, preferably 0.1 to 0.5 wt. %, based on the total composition, have been prepared and comprise an oil-soluble, pour point depressing copolymer of 1000 to 30,000 number average molecular weight consisting essentially of about equimolar proportions of maleic anhydride and 1-olefin, said 1-olefin being a mixture comprising from about 25 to 75, preferably 30 to 55, optimally about 50, mole percent of a straight chain higher olefin and from about 25 to 75, preferably 45 to 70, optimally about 50, mole percent of a lower olefin, said higher olefin having in the range of 20 to 24 carbon atoms and said lower olefin having in the range of 10 to 14 carbon atoms.

Such systems exhibit highly useful pour point depressant characteristics when admixed with mineral oil lubricants particularly those mineral oils having viscosities with the range of 70 to 350 SUS @ 100° F.

These copolymers can be esterified with alcohols having in the range of one to 8 carbon atoms to improve their pour point depressant activity; surprisingly, a branched alcohol, i.e., 2-ethylhexyl alcohol usefully enhances the pour point depressant activity of said copolymers produced from said mixtures of $C_{20-24}$ straight chain 1-olefins and $C_{6-14}$ 1-olefins, said mixtures comprising from 25 to 75 mole percent of $C_{20-24}$ 1-olefins and 25 to 75 mole percent of $C_{6-14}$ olefins.

Thus a further feature of this invention is a lubricating oil composition comprising a major proportion of a mineral lubricating oil, and a pour point depressing amount of about 0.01 to 3.0 wt. %, preferably 0.1 to 0.5 wt. %, of an oil-soluble pour point depressant which is the $C_1$ to $C_8$ alcohol, e.g., 2-ethylhexyl alcohol, ester of a copolymer consisting essentially of about equimolar proportions of maleic anhydride and 1-olefin, said 1-olefin being a mixture comprising from 25 to 75, preferably 30 to 55, optimally about 50, mole percent of a straight chain, higher olefin and from about 25 to 75, preferably 45 to 70, optimally about 50, mole percent of a lower olefin, said higher olefin having in the range of 20 to 24 carbon atoms and said lower olefin having in the range of 6 to 14 carbon atoms and wherein said copolymer of maleic anhydride and 1-olefin has a number average molecular weight in the range of 1,000 to 30,000.

DESCRIPTION OF THE PREFERRED EMBODIMENTS

The copolymers of the invention result from the addition reaction of about equimolar amounts of 1-olefins and an ethylenically unsaturated dicarboxylic anhydride such as maleic and itaconic. Maleic anhydride or a derivative is preferred.

Said anhydrides include those of the generic formula:

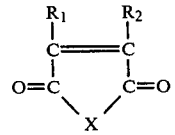

wherein $R_1$ and $R_2$ are hydrogen, or a halogen and X is oxygen, NH, or $NR_3$, wherein $R_3$ is an alkyl group, preferably a $C_1$ to $C_{40}$ alkyl. Suitable examples of such derivatives include itaconic anhydride, N-ethyl maleimide, N-hexyl maleimide, N-dodecyl maleimide, N-tetradecyl maleimide, N-eicosyl maleimide, N-tetracosyl maleimide, chloromaleic anhydride and dichloro maleic anhydride.

The copolymers have number average molecular weights in the range of about 1,000 to 30,000 and are more frequently in the range of about 2,000 to 6,000.

A suitable source for the straight chain $C_{20-24}$ 1-olefins is a commercial $C_{20}-C_{24}$ 1-olefin fraction containing about 90–95% monolefins and with the typical composition-

| Olefin Type | Approx. wt. % |
| --- | --- |
| straight chain α-olefin | 70 |
| vinylidene | 20 |

Such a commercial fraction was employed in the examples.

Alternatively, the individual 1-olefins:1-eicosene; 2-methyl-1-eicosene; 3-methyl-1-eicosene; 1-heneicosene; 1-docosene; 1-tricosene; 1-tetracosene; and mixtures thereof as desired can be employed.

A suitable source for the $C_6$ and $C_{8-14}$ lower 1-olefins may be the individual 1-olefins; 1-hexene; 1-octene; 2-methyl-1-heptene; 2,4,4-trimethyl-1-pentene; 1-nonene; 1-decene; 1-dodecene; 1-tridecene; 1-tetradecene; 1-undecene; although, mixtures thereof can be employed. Both the individual 1-olefins and mixtures are commercial, usually containing at least 90 wt. % 1-olefin. The $C_{6-14}$ lower olefins can be branched, however it is preferred that the 1-olefins having in the range of ten to fourteen carbons are straight carbon chain.

The reaction between the maleic anhydride and 1-olefins mixture can conveniently be carried out by mixing said olefins and maleic anhydride in about equal amounts, and heating the mixture to a temperature of at least 50° C., preferably at least 80° C. A free radical polymerization promoter such as azo isobutylnitrile, benzoyl peroxide, t-butyl hydroperoxide or di-t-butyl peroxide is used.

The copolymers of the invention can be esterified with saturated aliphatic alcohols having in the range of 1 to 8 carbon atoms to improve the pour point depressant activity of the copolymer. These alcohols can be either straight or branched chain and include methanol, ethanol, propanol, butanol, pentanol, hexanol, heptanol, octanol, 2-ethyl hexanol, etc. Surprisingly, a branched alcohol i.e., 2-ethylhexyl alcohol, has been found to provide unusually enhanced pour point depressant activity to said mixed 1-olefin/anhydride copolymers of the invention.

For purposes of this disclosure, a 1-olefin is a hydrocarbon which has a double bond between the $C_1$ and $C_2$ carbons and may or may not have another substituent on the $C_2$ carbon, e.g., 1-hexene and 2-methyl-1-pentene.

The oil-soluble reaction products of this invention can be incorporated in lubricating oil compositions, e.g., automotive crankcase lubricating oils, in concentrations within the range of about 0.01 to 3.0 wt. %, preferably 0.1 to 0.5 wt. %, of the total composition. The lubricants to which the polymeric products of this invention can be added include not only hydrocarbon oils derived from petroleum, tar sand or shale, but also include synthetic oils of the hydrocarbon or polyester variety and mixtures thereof.

The additive may be conveniently dispensed as a concentrate comprising 30–60 parts by weight, preferably about 50 parts by weight of the additive, per 100 parts by weight of the total weight of said concentrate, dissolved in from 40 to 97 parts by weight of a mineral lubricating oil, per 100 parts by weight of said total weight, with or without other additives being present. An oil-soluble additive is dissolved by admixture with the mineral oil by agitation at 150° F. for 3 hours. If the additive does not dissolve in at least 0.2 wt. % in said mineral oil at 150° F. within 3 hours, the additive is considered oil-insoluble for the purposes of this disclosure.

This invention will be further understood by reference to the following examples, which include preferred embodiments of the invention.

EXAMPLE 1

A copolymer of straight chain ($C_{20-24}$) 1-olefins and maleic anhydride was prepared by mixing 108 g. (1.1 mole) of maleic anhydride, 320 g. (1.0 mole) of said commercial fraction of $C_{20-24}$ 1-olefins, 400 ml. of ethylene dichloride and 2.4 g of Lucidol 70 (70% benzoyl peroxide and 30 wt. % water) in a liter resin pot which was fitted with an agitator, condenser, thermometer, nitrogen sparging tube and heating mantle. The mixture was heated to 38° C., sparged slightly with nitrogen and then heated to 72° C. where it was maintained for 3 hours with agitation. Thereafter 0.9 g. of Lucidol 70 was added and polymerization continued for an additional 18 hours by maintenance at 72°–80° C.

The polymerization product was freed of raw materials by dialysis against a rubber membrane for three hours with boiling toluene.

EXAMPLE 2

A copolymer of a mixture of straight chain ($C_{20-24}$) 1-olefins plus 1-hexene and maleic acid anhydride was prepared by the procedure of Example 1 except that 182 g. (1.9 mole) maleic anhydride, 324 g. (1 mole) of said commercial fraction of $C_{20-24}$ 1-olefins and 68 g. (0.8 mole) of hexene-1 was used. The copolymer product after dialysis was insoluble in oil at room temperature.

EXAMPLE 3

A copolymer of straight chain ($C_{20-24}$) plus $C_8$ 1-olefins and maleic anhydride was prepared by the procedure of Example 2 except that 92 g (0.9 mole) of 1-octene was used in place of 1-hexene.

EXAMPLE 4

A copolymer of straight chain ($C_{20-24}$) plus $C_{10}$ 1-olefins and maleic anhydride was prepared by the procedure of Example 2 except that 115 g. (0.8 mole) of 1-decene was used in place of 1-hexene.

EXAMPLE 5

The product of Example 1, i.e. the copolymer of straight chain $C_{20-24}$ 1-olefins and maleic anhydride, was esterified with 2-ethyl hexanol using p-toluene sulfonic acid as the catalyst and azeotroping off the water of esterification with toluene.

EXAMPLE 6

The product of Example 2, i.e. the copolymer of straight chain ($C_{20-24}$) plus $C_6$ 1-olefins and maleic anhydride, was esterified with 2-ethyl hexanol using the procedure of Example 5.

EXAMPLES 7–11

Several additional copolymers of about equimolar proportions of 1-olefins and maleic anhydride were prepared by mixing maleic anhydride and 2 grams of t-butyl perbenzoate in 140 ml. of toluene in the apparatus of Example 1. The mixture was heated to reflux at 110°–115° C. and the 1-olefin charge slowly added thereafter over a 2 hour period followed by heating 2 hours more at reflux. The mixture was thereafter, cooled, placed on a steam bath and nitrogen sparged to remove the toluene. The product was thereafter dialyzed as in Example 1. Example 7 varied in procedure in that 10.5 grams of t-butyl perbenzoate was used and added incrementally over the first 2 hour period of reflux.

of $C_{20-24}$ olefins and a $C_{10}$ olefin, respectively. Examples 3 and 4 gave products having a pour point of $-20°$ F. (although in one instance an anomalous result of no improvement was found with Example 3), or a $5°$ improvement over the product of Example 1. Table II shows products of Examples 1, 3 and 4 were of comparable molecular weight. Thus, the pour point results of

TABLE I

| Reagent | EXAMPLE | | | | | | | | | | | |
|---|---|---|---|---|---|---|---|---|---|---|---|---|
| | 7 | | 7A | | 8 | | 9 | | 10 | | 11 | |
| | gms. | moles | gms. | moles | gms. | moles | gms. | moles | gms. | moles | gms. | moles |
| Maleic Anhydride | 34.4 | 0.35 | 172 | 1.75 | 34.4 | 0.35 | 34.4 | 0.35 | 34.4 | 0.35 | 34.4 | 0.35 |
| 1-octadecene* | 106 | 0.42 | 530 | 1.89 | 58.3 | 0.23 | — | — | — | — | 58.3 | 0.23 |
| 1-hexadecene* | — | — | — | — | — | — | 84.9 | 0.38 | 46.6 | 0.21 | — | — |
| 1-octene | — | — | — | — | 17.6 | 0.16 | — | — | 17.6 | 0.16 | — | — |
| 1-hexene | — | — | — | — | — | — | — | — | — | — | 13.2 | 0.16 |

*Commercial material of 90 wt. % pure

The copolymers prepared in Examples 1–6 had the following properties.

TABLE II

| Product Example | Yield % | Mol. Wt.* $\overline{Mn}$ | % C | % H |
|---|---|---|---|---|
| 1 | 65 | 4400 | 71.5 | 11.6 |
| 2 | 67 | 5400 | 71.7 | 10.9 |
| 3 | 47+ | 4700 | 71.4 | 10.6 |
| 4 | 48+ | 3000 | 72.7 | 7.5 |
| 5 | — | — | — | — |
| 6 | 68 | 7000 | 74.5 | 11.6 |

The various copolymers described above admixed at 150° F. by stirring 0.2 grams with 100 grams of mineral lubricant oil and subjected to an ASTM test which demonstrates the copolymers of the invention be highly effective pour point depressants as is apparent from the following Table III.

Table III clearly show, that by moderating the 1-olefin content of the polymer of Example 1, by including $C_{10}$ 1-olefin, resulted in a 5° improvement in the pour point test. Examples 8, 10 and 11 which relate to mixtures of higher, i.e. $C_{18}$ or $C_{16}$ and lower olefins which places them outside the scope of the present invention are insoluble in the mineral lubricating oil and thus lack the property of pour point depression. The $C_{18}$ 1-olefin copolymer of Lippincott is shown in Example 7 to exhibit pour point depressancy but yet a $C_{18}$ 1-olefin copolymer of Example 7A has no activity.

Table II shows that Example 6 further reduces the pour point to $-25°$ F. Example 6 is a copolymer of a higher and lower olefin ($C_6$) with maleic anhydride, further esterified with 2-ethyl hexanol. Example 5 shows the copolymer of the $C_{20-24}$ higher olefin and maleic anhydride, esterified with 2-ethyl hexanol which surprisingly provided a $-25°$ F. pour point as opposed

TABLE III

| Copolymer Product of Example | Moles 1-Olefins Reacted with Maleic Anhydride to Provide Equimolar Copolymer of 1-Olefins and Maleic Anhydride | | | | | | Pour Depressant Activity | |
|---|---|---|---|---|---|---|---|---|
| | $C_{20-24}$ | $C_{18}$ | $C_{16}$ | $C_{10}$ | $C_8$ | $C_6$ | Wt. % Additive | Pour Point, °F. Additive Treated Oil* |
| 1 | 1.1 | — | — | — | — | — | 0.2 | −15 |
| 2 | 1.0 | — | — | — | — | 0.8 | insoluble | 0 |
| 3 | 1.0 | — | — | — | 0.9 | — | 0.2 | −20, 0** |
| 4 | 1.0 | — | — | 0.9 | — | — | 0.2 | −20 |
| 5 (Ester) | 1.0 | — | — | — | — | — | 0.2 | −25 |
| 6 (Ester) | 1.0 | — | — | — | — | 0.8 | 0.2 | −25 |
| 7 | — | 0.42 | — | — | — | — | 0.2 | −20 |
| 7A | — | 1.89 | — | — | — | — | insoluble | 0** |
| 8 | — | 0.23 | — | — | 0.16 | — | insoluble | −5 |
| 9 | — | — | 0.38 | — | — | — | insoluble | 0 |
| 10 | — | — | 0.21 | — | 0.16 | — | insoluble | 0 |
| 11 | — | 0.23 | — | — | — | 0.16 | insoluble | 0 |

*ASTM Test D-97. The treated oil is a mineral lubricating oil having a pour point of 0° F. and a viscosity @100° F. of about 150 SUS.
**Anomalous result.

The data of Table III shows the individual improvement in pour point depressant activity obtained by using the mixture of lower and higher olefins in the copolymer of 1-olefin and maleic anhydride according to this invention and the still further improvement obtained by esterifying the maleic anhydride with the 2-ethyl hexyl alcohol in Examples 5 and 6. These improvements in pour point shows the product of Example 1 gave a pour point of $-15°$ F. As seen, Example 1 is a copolymer of the higher olefin, that is a mixture of $C_{20-24}$ olefins, with maleic anhydride, whereas Examples 3 and 4 are copolymers of a mixture of higher and lower olefin, that is a mixture of $C_{20-24}$ olefins and a $C_8$ olefin; and, a mixture to the $-15°$ F. pour point of Example 1 (the unesterified copolymer of Example 5). Therefore, Table III's data of Examples 3 and 4 shows by using a mixture of lower and higher olefins, a greater increase in pour point depressancy can be obtained as opposed to using the higher olefins by themselves. Table III's data of Examples 5 and 6 further shows esterifying the 1-olefin maleic anhydride copolymer with the 2-ethyl hexanol also results in a further depression, i.e. an improvement, in pour point.

Although the reason for the above results are not fully understood, it is believed the inclusion of the lower olefin may help break up the crystallinity of the polymer by making it random, and thereby cause it to be more effective. One would not usually expect any pour point effect from the $C_8$ and $C_{10}$ olefins as the chain lengths are too short to be generally effective as a pour point depressant in lubricating oil. Similarly, one would not have ordinarily expected the 2-ethyl hexyl alcohol would give an improvement as it is branched, contrary to the general teachings of the art of the necessity of using straight chain alcohols. In addition, the 2-ethyl hexyl alcohol is considerably shorter than what the art generally teaches as necessary in order to form a pour point depressant. Yet each of these two features, namely the inclusion of the short chain olefins and the inclusion of the short chain branched alcohol further improved the pour point depressant activity of the copolymer. It is noted that the copolymers of the invention are particularly useful for distillate type mineral lubricating oils having a viscosity of from about 70 to 350 SUS at 100° F. and normal pour points of +5 to +15° F.

The copolymers of Examples 1 and 2 are disclosed in my copending U.S. Patent Application Ser. No. 515,564 filed herewith on Oct. 17, 1974 as dewaxing aids and within the class of precursors of sludge dispersants disclosed in U.S. Patent Application Ser. No. 515,562 filed herewith on Oct. 17, 1974.

It is to be understood that the Examples present in the foregoing specification are merely illustrative of this invention and are not intended to limit it in any manner; nor is the invention to be limited by any theory regarding its operability. The scope of the invention is to be determined by the appended claims.

What is claimed is:

1. A lubricating oil composition comprising, a major proportion of a mineral lubricating oil, and a pour point depressing amount of about 0.01 to 3.0 wt. % of an oil-soluble pour point depressing copolymer of 1,000 to 30,000 number average molecular weight consisting essentially of about equimolar proportions of maleic anhydride and 1-olefin, said 1-olefin being a mixture comprising from about 25 to 75 mole percent of a straight chain higher olefin and from about 25 to 75 mole percent of a lower olefin, said higher olefin having in the range of 20 to 24 carbon atoms and said lower olefin having 10 to 14 carbon atoms.

2. A lubricating oil composition according to claim 1 wherein said mixture is of from about 30 to 55 mole percent of said higher olefin and of from about 45 to 70 mole percent of said lower olefin.

3. A lubricating oil composition according to claim 1 wherein said mixture is of about equimolar proportions of said higher olefin and said lower olefin.

* * * * *